US011795855B2

(12) United States Patent
Chinzei et al.

(10) Patent No.: US 11,795,855 B2
(45) Date of Patent: Oct. 24, 2023

(54) EXHAUST GAS PURIFICATION CATALYST

(71) Applicants: Isao Chinzei, Toyota (JP); Takahiro Nishio, Toyota (JP); Shogo Shirakawa, Toyota (JP); Masahide Miura, Toyota (JP); Hiromasa Suzuki, Toyota (JP); Yuki Kido, Kakegawa (JP); Minoru Ito, Kakegawa (JP); Sho Hoshino, Kakegawa (JP); Shin Nakayama, Kakegawa (JP)

(72) Inventors: Isao Chinzei, Toyota (JP); Takahiro Nishio, Toyota (JP); Shogo Shirakawa, Toyota (JP); Masahide Miura, Toyota (JP); Hiromasa Suzuki, Toyota (JP); Yuki Kido, Kakegawa (JP); Minoru Ito, Kakegawa (JP); Sho Hoshino, Kakegawa (JP); Shin Nakayama, Kakegawa (JP)

(73) Assignees: TOYOTA JIDOSHA KABUSHIKI KAISHA, Toyota (JP); CATALER CORPORATION, Kakegawa (JP)

(*) Notice: Subject to any disclaimer, the term of this patent is extended or adjusted under 35 U.S.C. 154(b) by 42 days.

(21) Appl. No.: 17/211,112

(22) Filed: Mar. 24, 2021

(65) Prior Publication Data
US 2021/0301706 A1 Sep. 30, 2021

(30) Foreign Application Priority Data

Mar. 25, 2020 (JP) .............................. JP2020-054639

(51) Int. Cl.
*F01N 3/28* (2006.01)
*B01J 23/44* (2006.01)
*B01J 23/46* (2006.01)
*B01J 21/14* (2006.01)
*B01J 35/00* (2006.01)
*B01J 35/02* (2006.01)

(52) U.S. Cl.
CPC ............ *F01N 3/2803* (2013.01); *B01J 21/14* (2013.01); *B01J 23/44* (2013.01); *B01J 23/464* (2013.01); *B01J 35/0006* (2013.01); *B01J 35/023* (2013.01); *F01N 2370/02* (2013.01); *F01N 2510/0684* (2013.01)

(58) Field of Classification Search
CPC ....... F01N 3/2803; B01J 23/44; B01J 23/464; B01J 35/0006; B01J 35/023
See application file for complete search history.

(56) References Cited

U.S. PATENT DOCUMENTS

| 5,147,842 | A | 9/1992 | Funabiki et al. |
| 6,047,544 | A | 4/2000 | Yamamoto et al. |
| 8,168,560 | B2 | 5/2012 | Taki et al. |
| 8,337,791 | B2 | 12/2012 | Kohara et al. |
| 11,426,710 | B2 | 8/2022 | Nishio et al. |
| 2006/0189480 | A1 | 8/2006 | Takeshima |
| 2009/0175773 | A1* | 7/2009 | Chen .................. B01J 20/3021 |
| | | | 422/177 |
| 2009/0239745 | A1 | 9/2009 | Yamato et al. |
| 2009/0275468 | A1 | 11/2009 | Taki et al. |
| 2013/0213000 | A1 | 8/2013 | Segawa |
| 2015/0375206 | A1 | 12/2015 | Aoki |
| 2016/0214088 | A1 | 7/2016 | Shirakawa et al. |
| 2017/0296968 | A1 | 10/2017 | Yoshida et al. |
| 2018/0304238 | A1 | 10/2018 | Saito et al. |
| 2019/0120104 | A1 | 4/2019 | Inoda et al. |
| 2019/0126248 | A1 | 5/2019 | Chinzei et al. |
| 2020/0290019 | A1 | 9/2020 | Onoe et al. |
| 2020/0391186 | A1 | 12/2020 | Shirakawa et al. |

FOREIGN PATENT DOCUMENTS

| CN | 105817223 A | 8/2016 |
| CN | 107288728 A | 10/2017 |
| CN | 109089414 A | 12/2018 |
| EP | 2324919 A1 | 5/2011 |
| JP | 2000-051707 A | 2/2000 |
| JP | 2007-038085 A | 2/2007 |
| JP | 2009-273986 A | 11/2009 |
| JP | 2010-234309 A | 10/2010 |
| JP | 2011-016090 A | 1/2011 |
| JP | 2014-083492 A | 5/2014 |
| JP | 2014-151306 A | 8/2014 |
| JP | 2014-152306 A | 8/2014 |
| JP | 2016-112537 A | 6/2016 |
| JP | 2016-147256 A | 8/2016 |

(Continued)

OTHER PUBLICATIONS

U.S. Appl. No. 17/107,997, filed Dec. 1, 2020 in the name of Seiji Nakahigashi et al.

(Continued)

*Primary Examiner* — Yong L Chu
(74) *Attorney, Agent, or Firm* — Oliff PLC

(57) ABSTRACT

Provided is an exhaust gas purification catalyst capable of reducing a noble metal amount while maintaining a catalyst performance, which comprises a substrate and at least three catalyst coating layers formed on the substrate, the first and third catalyst coating layers contain Pd as a catalyst metal and are formed in a range of a predetermined length from an upstream end surface in an exhaust gas flow direction, and the second catalyst coating layer contains Rh as a catalyst metal and is formed in a range of a predetermined length from a downstream end surface in the exhaust gas flow direction.

2 Claims, 5 Drawing Sheets

(56) References Cited

FOREIGN PATENT DOCUMENTS

| | | |
|---|---|---|
| JP | 2017-104825 A | 6/2017 |
| JP | 2017-115690 A | 6/2017 |
| JP | 2018-176109 A | 11/2018 |
| WO | 2007/040248 A1 | 4/2007 |
| WO | 2009/089151 A1 | 7/2009 |
| WO | 2017/159628 A1 | 9/2017 |
| WO | 2017/179679 A1 | 10/2017 |
| WO | 2020175142 A1 | 9/2020 |

OTHER PUBLICATIONS

U.S. Appl. No. 17/121,245, filed Dec. 14, 2020 in the name of Norimichi Shimano et al.
U.S. Appl. No. 17/107,224, filed Nov. 30, 2020 in the name of Isao Chinzei et al.
Mar. 30, 2022 Notice of Allowance issued in U.S. Appl. No. 17/107,224.
Nov. 30, 2022 Notice of Allowance issued in U.S. Appl. No. 17/107,997.
Nov. 29, 2022 Office Action issued in U.S. Appl. No. 17/121,245.
Mar. 21, 2023 Notice of Allowance issued in U.S. Appl. No. 17/121,245.
Apr. 14, 2023 Corrected Notice of Allowability issued in U.S. Appl. No. 17/121,245.

\* cited by examiner

EXHAUST GAS PURIFICATION CATALYST

CROSS REFERENCE TO RELATED APPLICATIONS

The present application claims priority from Japanese patent application JP 2020-054639 filed on Mar. 25, 2020, the entire content of which is hereby incorporated by reference into this application.

BACKGROUND

Technical Field

The present disclosure relates to an exhaust gas purification catalyst.

Background Art

An exhaust gas discharged from an internal combustion engine of an automobile and the like contains harmful components, such as carbon monoxide (CO), hydrocarbons (HC), and nitrogen oxides (NOx), and the harmful components are purified by an exhaust gas purification catalyst before discharged into the atmosphere. Conventionally, a three-way catalyst that simultaneously performs oxidation of CO and HC and reduction of NOx is used as the exhaust gas purification catalyst, and a catalyst that uses a noble metal, such as platinum (Pt), palladium (Pd), and rhodium (Rh), as a catalyst metal is widely employed as the three-way catalyst.

For example, JP 2018-176109 A discloses an exhaust gas purification catalyst having a substrate and a catalyst coating layer that has a two-layer structure formed on the surface of the substrate, wherein an upper layer of the catalyst coating layer contains Rh, Pd, and a carrier, a lower layer of the catalyst coating layer contains at least one noble metal selected from Pd and Pt and a carrier, 65% by mass or more of Pd in the upper layer exists in a layer up to 50% of the upper layer in a thickness direction from the surface of the upper layer, which is relatively remote from the surface of the substrate, and the ratio of Pd to Rh by mass (Pd/Rh) is 0.5 or more to 7.0 or less in the upper layer.

Recently, while emission regulations have become stricter, the amount of the noble metals used for the exhaust gas purification catalyst is desired to be reduced from the aspect of the resource risk. However, in the conventional exhaust gas purification catalyst, reducing the amount of the noble metals causes the degradation of an exhaust gas purification performance, a warm-up performance, and an OSC performance in some cases.

Here, as one method for reducing the usage of the noble metal in the exhaust gas purification catalyst, there has been known a method to use the noble metal by supporting the noble metal as fine particles on a carrier. For example, JP 2016-147256 A discloses a method for manufacturing a catalyst that includes a step of supporting noble metal particles on an oxide carrier to obtain a noble metal supported catalyst and a step of performing a heating process to the noble metal supported catalyst in a reducing atmosphere to control a particle size of the noble metal in a predetermined range. JP 2016-147256 A discloses that the particle sizes of the noble metal particles on the oxide carrier were able to be controlled in a range of 2.8 nm or more to 3.8 nm or less in Examples.

JP 2007-38085 A discloses a method for manufacturing a catalyst that includes a step of causing a reductant to act to a catalyst in which noble metal particles are supported on an oxide carrier, enlarging the noble metal particles having small particle sizes, and obtaining the minimum particle size of the noble metal particles of 1 nm or more. JP 2007-38085 A discloses that the particle sizes of the noble metal particles on the oxide carrier were able to be controlled to 3.0 nm or more to 4.1 nm or less in Examples.

However, in the conventional catalyst that uses the noble metal particles having the controlled particle sizes, the noble metal particles aggregate and degrade during a catalytic reaction, thus causing insufficient durability of the catalyst in some cases.

SUMMARY

As described above, while the exhaust gas purification catalyst is desired to reduce the noble metal amount, in the conventional exhaust gas purification catalyst, the reduction of the noble metal amount causes the degradation of the exhaust gas purification performance, the warm-up performance, and the OSC performance in some cases. In the conventional exhaust gas purification catalyst that uses the noble metal particles having the controlled particle sizes, the durability of the catalyst is not sufficient, thus failing to sufficiently reduce the noble metal amount in some cases. Accordingly, the present disclosure provides an exhaust gas purification catalyst capable of reducing a noble metal amount while maintaining a catalyst performance.

The inventors examined various means to solve the problem, and found that in an exhaust gas purification catalyst that comprises at least three catalyst coating layers, a noble metal amount can be reduced while maintaining a catalyst performance by specifying compositions and coat widths of the respective catalyst coating layers. Thus, the inventors achieved the present disclosure.

That is, the gist of the present disclosure is as follows.
(1) An exhaust gas purification catalyst comprising: a substrate; and a catalyst coating layer formed on the substrate, wherein the catalyst coating layer comprises at least a first catalyst coating layer, a second catalyst coating layer, and a third catalyst coating layer, the first catalyst coating layer is formed on the substrate, the second catalyst coating layer is formed on the first catalyst coating layer, and the third catalyst coating layer is formed on the second catalyst coating layer, wherein the first catalyst coating layer contains Pd as a catalyst metal, and is formed in a range of a length of 15% or more to 60% or less of an entire length of the substrate from an upstream end surface in an exhaust gas flow direction, wherein the second catalyst coating layer contains Rh as a catalyst metal, and is formed in a range of a length of 60% or more to 100% or less of the entire length of the substrate from a downstream end surface in the exhaust gas flow direction, and wherein the third catalyst coating layer contains Pd as a catalyst metal, and is formed in a range of a length of 15% or more to 100% or less of the entire length of the substrate from the upstream end surface in the exhaust gas flow direction.
(2) The exhaust gas purification catalyst according to (1), wherein Rh in the second catalyst coating layer is Rh fine particles having an average particle size of 1.0 nm or more to 2.0 nm or less measured by a transmission electron microscope observation, and a standard deviation a of the particle size of 0.8 nm or less.
(3) The exhaust gas purification catalyst according to (1) or (2), wherein the catalyst coating layer further comprises a fourth catalyst coating layer formed on the third catalyst coating layer, the fourth catalyst coating layer contains Pd as a catalyst metal, and the fourth catalyst coating layer is formed in a range of a length of 15% or more to 50% or less of the entire length of the substrate from the upstream end surface in the exhaust gas flow direction.

The present disclosure can provide the exhaust gas purification catalyst capable of reducing the noble metal amount while maintaining the catalyst performance.

DETAILED DESCRIPTION

Figure 1:
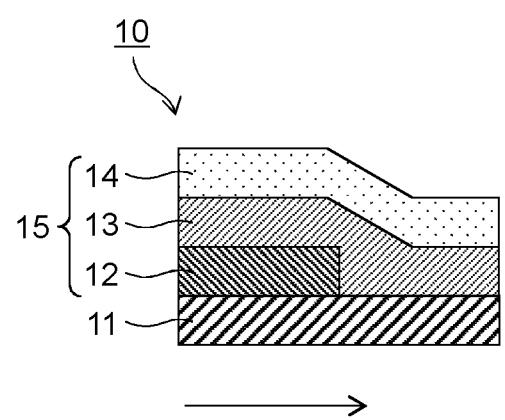
FIG. 1 is a cross-sectional schematic diagram illustrating a first embodiment of an exhaust gas purification catalyst of the present disclosure.

The following describes embodiments of the present disclosure in detail.

An exhaust gas purification catalyst of the present disclosure comprises a substrate and a catalyst coating layer formed on the substrate. The catalyst coating layer comprises at least a first catalyst coating layer formed on the substrate, a second catalyst coating layer formed on the first catalyst coating layer, and a third catalyst coating layer formed on the second catalyst coating layer. The catalyst coating layer only needs to comprise three layers or more and comprises three layers or four layers in some embodiments.

The substrate used for the exhaust gas purification catalyst of the present disclosure is not specifically limited, and a generally used material in a honeycomb shape having multiple cells can be used. The material of the substrate includes a ceramic material having heat resistance, such as cordierite ($2MgO \cdot 2Al_2O_3 \cdot 5SiO_2$), alumina, zirconia, and silicon carbide, and a metal material formed of a metal foil, such as a stainless steel. From the aspect of cost, the cordierite is used in some embodiments.

The first catalyst coating layer is formed on the substrate.

The first catalyst coating layer contains palladium (Pd) as a catalyst metal. The first catalyst coating layer may contain a catalyst metal other than Pd. As the catalyst metal, a platinum group noble metal, such as rhodium (Rh), platinum (Pt), ruthenium (Ru), osmium (Os), and iridium (Ir), can be used. The first catalyst coating layer may contain only Pd as the catalyst metal in some embodiments.

The Pd content in the first catalyst coating layer is 0.01 g/L or more to 20 g/L or less based on the volume of the substrate in some embodiments and may be 0.1 g/L or more to 10 g/L or less in some embodiments. When the Pd content in the first catalyst coating layer is 0.01 g/L or more to 20 g/L or less, a high warm-up performance and a high purification performance are provided.

The first catalyst coating layer contains an OSC material that has an oxygen storage capacity in some embodiments. The OSC material is an inorganic material having the oxygen storage capacity. The OSC material stores oxygen when a lean exhaust gas is supplied and releases the stored oxygen when a rich exhaust gas is supplied, thereby absorbing and reducing fluctuation of the exhaust gas atmosphere to ensure keeping the exhaust gas atmosphere to the proximity of a stoichiometric air-fuel ratio. A three-way catalyst highly efficiently purifies harmful components, such as CO, HC, and NOx, at the proximity of the stoichiometric air-fuel ratio. The first catalyst coating layer containing the OSC material ensures the efficient conversion of the harmful component in the exhaust gas.

The OSC material is not specifically limited, and includes cerium oxide (ceria: $CeO_2$), a composite oxide containing the ceria (for example, ceria-zirconia ($ZrO_2$) composite oxide (CZ composite oxide or ZC composite oxide)), and the like. Among the above-described OSC materials, the ceria-zirconia ($CeO_2$—$ZrO_2$) composite oxide is used in some embodiments because of the high oxygen storage capacity and the relatively low price. The ceria-zirconia composite oxide may contain an oxide of a metallic element other than Ce or Zr. The metallic element other than Ce or Zr is a rare earth element (note that, Ce is excluded) in some embodiments. The rare earth element can include yttrium (Y), lanthanum (La), praseodymium (Pr), neodymium (Nd), samarium (Sm), europium (Eu), gadolinium (Gd), erbium (Er), ytterbium (Yb), lutetium (Lu), and the like. Among them, the rare earth element is one or more selected from Y, La, Pr, Nd, and Eu in some embodiments, or may be Y and La. The ceria-zirconia composite oxide is used in a form of a composite oxide with lanthana ($La_2O_3$) and yttria ($Y_2O_3$) in some embodiments. The mixture ratio of ceria to zirconia in the ceria-zirconia composite oxide is $CeO_2/ZrO_2=0.01$ or more to 9.0 or less based on the weight in some embodiments.

The content of the OSC material in the first catalyst coating layer is 10 g/L or more to 80 g/L or less based on the volume of the substrate in some embodiments or may be 20 g/L or more to 60 g/L or less in some embodiments. When the content of the OSC material in the first catalyst coating layer is 10 g/L or more to 80 g/L or less, the high purification performance is ensured.

The first catalyst coating layer may contain any other component in addition to the catalyst metal and the OSC material. The other component is not specifically limited and includes, for example, a metal oxide, an alkaline-earth element, such as calcium and barium, as well as transition metal elements, compounds containing them, and the like. When the first catalyst coating layer contains the other component, its content is 80 g/L or less based on the volume of the substrate in some embodiments or may be 60 g/L or less in some embodiments.

A metal contained in the metal oxide includes, for example, one or more metals selected from group 3, group 4, and group 13 of the periodic table and a lanthanoid-based metal. When the metal oxide contains the oxides of two or more metals, it may be any of a mixture of two or more metal oxides, a composite oxide containing two or more metals, or a mixture of one or more metal oxides and one or more composite oxides.

The metal oxide may be the oxide of one or more metals selected from, for example, scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al), or the oxide of one or more metals selected from Y, La, Ce, Ti, Zr, and Al in some embodiments. As the metal oxide, alumina ($Al_2O_3$) or a composite oxide of $Al_2O_3$ and lanthana ($La_2O_3$) is used in some embodiments.

As the other component, from the aspect of improving the exhaust gas purification performance, a barium compound, such as a barium carbonate, a barium oxide, a barium nitrate, and a barium sulfate, is used in some embodiments, and the barium sulfate stabilized in an operating temperature range and an operating atmosphere of the catalyst may be used in some embodiments.

In the first catalyst coating layer, Pd is supported on carrier particles in some embodiments. The carrier particles are not specifically limited, and for example, the above-described OSC materials and the other metal oxides can be used. In some embodiments, Pd is supported on the OSC material. As the supporting method, a common supporting method, such as an impregnation supporting method, an adsorption supporting method, and a water-absorption supporting method, can be used.

When Pd supported on the carrier particles is used, the support amount of Pd is, for example, 30% by weight or less, 20% by weight or less, 10% by weight or less, 5% by weight or less, 3% by weight or less, 1% by weight or less, 0.7% by weight or less, 0.5% by weight or less, 0.3% by weight or less, or 0.2% by weight or less based on the weight of the carrier particles. The support amount of Pd is, for example, 0.01% by weight or more, 0.02% by weight or more, 0.05% by weight or more, 0.07% by weight or more, 0.1% by weight or more, 0.2% by weight or more, 0.5% by weight or more, 1% by weight or more, or 10% by weight or more based on the weight of the carrier particles.

The first catalyst coating layer is formed from an upstream end surface in an exhaust gas flow direction in a range of the length of 15% or more to 60% or less of the entire length of the substrate. That is, the first catalyst coating layer is formed in a part of the upstream side on the substrate, and a coat width of the first catalyst coating layer is in a range of the length of 15% or more to 60% or less of the entire length of the substrate from the upstream end surface in the exhaust gas flow direction. When the coat width of the first catalyst coating layer is the length of 15% or more of the entire length of the substrate from the upstream end surface, the catalyst coating layer can be easily prepared, and the length of 60% or less increases the noble metal density, thus improving the warm-up performance. The coat width of the first catalyst coating layer is 15% or more to 50% or less of the entire length of the substrate from the upstream end surface in the exhaust gas flow direction in some embodiments, or may be in a range of the length of 15% or more to 30% or less. The coat width of the first catalyst coating layer may be the length of 25% or more to 50% or less of the entire length of the substrate from the upstream end surface in the exhaust gas flow direction.

The second catalyst coating layer is formed on the first catalyst coating layer. In the exhaust gas purification catalyst of the present disclosure, the first catalyst coating layer is formed in a part of the upstream side on the substrate. The second catalyst coating layer formed in the downstream side only needs to have at least a part formed on the first catalyst coating layer, and a part in the downstream is formed on the substrate (see FIG. 1 and FIG. 2).

The second catalyst coating layer contains rhodium (Rh) as a catalyst metal. When the second catalyst coating layer contains Rh, NOx in the exhaust gas is mainly converted.

As Rh in the second catalyst coating layer, Rh fine particles (hereinafter also referred to as particle size-controlled Rh fine particles), whose average particle size and standard deviation a of the particle size are controlled to specific ranges, are used in some embodiments. Because of the relatively small average particle size, the particle size-controlled Rh fine particles have a significantly large specific surface area, thus having a high catalytic activity. Since the particle size-controlled Rh fine particles have a narrow particle size distribution and low proportions of coarse particles and fine particles, the particle size-controlled Rh fine particles have high durability and high catalytic activity. By the use of the particle size-controlled Rh fine particles, the catalytic activity and the OSC performance improve, thereby ensuring reduction of the usage of the Rh.

The particle size-controlled Rh fine particles have the average particle size of 1.0 nm or more to 2.0 nm or less. In the present disclosure, the average particle size of the particle size-controlled Rh fine particles is a number average particle size obtained by directly measuring projected area equivalent diameters based on an image taken in an observation with a transmission electron microscope (TEM) and analyzing particle groups having a cardinal number of 100 or more.

By controlling the average particle size of the particle size-controlled Rh fine particles to 1.0 nm or more, the proportion of fine particles having the particle size of less than 1.0 nm, which are considered to be aggregated to cause coarsening during a catalytic reaction, can be reduced. Therefore, the deterioration of the Rh fine particles can be suppressed, thus ensuring the improved catalyst durability. Meanwhile, by controlling the average particle size of the particle size-controlled Rh fine particles to 2.0 nm or less, the surface areas of the Rh fine particles can be increased, thus ensuring the improved catalytic activity. The average particle size of the particle size-controlled Rh fine particles is 1.1 nm or more in some embodiments, or may be 1.2 nm or more. The average particle size of the particle size-controlled Rh fine particles is 1.9 nm or less in some embodiments, or may be 1.8 nm or less or 1.6 nm or less. The average particle size of the particle size-controlled Rh fine particles is 1.1 nm or more to 1.9 nm or less in some embodiments, or may be 1.2 nm or more to 1.8 nm or less.

The particle size-controlled Rh fine particles have a standard deviation a of the particle size, which is measured by the transmission electron microscope observation, of 0.8 nm or less. Since the particle size-controlled Rh fine particles have the standard deviation a of the particle size of 0.8 nm or less, the particle size distribution is sharp, and the proportions of the fine particles and the coarse particles are low. Because of the small number of the fine particles, the aggregation of the Rh fine particles during the catalytic reaction is suppressed, thereby suppressing the deterioration of Rh and improving the catalyst durability. Because of the small number of the coarse particles, the surface areas of the Rh fine particles are increased, thereby improving the catalytic activity.

The standard deviation a of the particle size-controlled particle size of the Rh fine particles is 0.7 nm or less in some embodiments, or may be 0.6 nm or less or 0.5 nm or less. While the particle sizes of the particle size-controlled Rh fine particles may be monodispersed, the effects of the disclosure can be provided even when the standard deviation a is 0.2 nm or more, 0.3 nm or more, or 0.4 nm or more.

For the particle size-controlled Rh fine particles, the proportion of the fine particles having the particle size of less than 1.0 nm is especially reduced. Because of the small proportion of the fine particles having the particle size of less than 1.0 nm, the aggregation of the Rh fine particles during the catalytic reaction is suppressed, thereby suppressing the deterioration of Rh and improving the catalyst durability. For the particle size-controlled Rh fine particles, the proportion of the Rh fine particles having the particle size of less than 1.0 nm is 5% by weight or less based on the total weight of the Rh fine particles in some embodiments. This value may be 4% by weight or less, 3% by weight or less, 2% by weight or less, 1% by weight or less, 0.5% by weight or less, 0.3% by weight or less, or 0.1% by weight or less. The Rh fine particles having the particle size of less than 1.0 nm does not have to be contained at all.

In some embodiments, the particle size-controlled Rh fine particles have the average particle size of 1.2 nm or more to 1.8 nm or less in the measurement by the transmission electron microscope, and the proportion of the Rh fine particles having the particle size of less than 1.0 nm is 5.0% by weight or less based on the total weight of the Rh fine particles.

The Rh content in the second catalyst coating layer is 0.01 g/L or more to 5 g/L or less based on the volume of the substrate in some embodiments or may be 0.05 g/L or more to 2.5 g/L or less in some embodiments. When the Rh content in the second catalyst coating layer is 0.01 g/L or more to 5 g/L or less, the high catalytic activity can be achieved.

The second catalyst coating layer may contain a catalyst metal other than Rh. As the catalyst metal, a platinum group noble metal, such as ruthenium (Ru), palladium (Pd), osmium (Os), iridium (Ir), and platinum (Pt), can be used. The second catalyst coating layer may contain Rh alone as the catalyst metal.

The second catalyst coating layer contains an OSC material in some embodiments. The OSC material is not specifically limited, and includes cerium oxide (ceria: $CeO_2$), a composite oxide containing the ceria (for example, ceria-zirconia ($ZrO_2$) composite oxide (CZ composite oxide or ZC composite oxide)), and the like. Among the above-described OSC materials, the ceria-zirconia ($CeO_2$—$ZrO_2$) composite oxide is used in some embodiments because of the high oxygen storage capacity and the relatively low price. The ceria-zirconia composite oxide may contain an oxide of a metallic element other than Ce or Zr. The metallic element other than Ce or Zr is a rare earth element (note that, Ce is excluded) or aluminum (Al) in some embodiments. The rare earth element can include yttrium (Y), lanthanum (La), praseodymium (Pr), neodymium (Nd), samarium (Sm), europium (Eu), gadolinium (Gd), erbium (Er), ytterbium (Yb), lutetium (Lu), and the like. Among them, the rare earth element is one or more selected from Y, La, Pr, Nd, and Eu in some embodiments, or may be Y, La, and Nd in some embodiments. The ceria-zirconia composite oxide is used in a form of a composite oxide with alumina ($Al_2O_3$) or a form of a composite oxide with lanthana ($La_2O_3$) and yttria ($Y_2O_3$) in some embodiments. The mixture ratio of ceria to zirconia in the ceria-zirconia composite oxide is $CeO_2$/$ZrO_2$=0.01 or more to 9.0 or less based on the weight in some embodiments.

The content of the OSC material in the second catalyst coating layer is 10 g/L or more to 200 g/L or less based on the volume of the substrate in some embodiments or may be 20 g/L or more to 150 g/L or less in some embodiments. When the content of the OSC material in the second catalyst coating layer is 10 g/L or more to 200 g/L or less, the high purification performance is ensured in the second catalyst coating layer.

The second catalyst coating layer may contain any other component in addition to the catalyst metal and the OSC material. The other component is not specifically limited and includes a metal oxide and the like. When the second catalyst coating layer contains the other component, its content is 80 g/L or less based on the volume of the substrate in some embodiments or may be 60 g/L or less in some embodiments.

A metal contained in the metal oxide includes, for example, one or more metals selected from group 3, group 4, and group 13 of the periodic table and a lanthanoid-based metal. When the metal oxide contains the oxides of two or more metals, it may be any of a mixture of two or more metal oxides, a composite oxide containing two or more metals, or a mixture of one or more metal oxides and one or more composite oxides.

The metal oxide may be the oxide of one or more metals selected from, for example, scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al), or the oxide of one or more metals selected from Y, La, Ce, Ti, Zr, and Al in some embodiments. As the metal oxide, alumina ($Al_2O_3$) or a composite oxide of $Al_2O_3$ and lanthanum ($La_2O_3$) is used in some embodiments.

In the second catalyst coating layer, Rh is supported on carrier particles in some embodiments. The carrier particles are not specifically limited, and for example, the above-described OSC materials and the other metal oxides can be used. In some embodiments, Rh is supported on the OSC material. As the supporting method, a common supporting method, such as an impregnation supporting method, an adsorption supporting method, and a water-absorption supporting method, can be used.

When Rh supported on the carrier particles is used, the support amount of Rh is, for example, 10% by weight or less, 5% by weight or less, 3% by weight or less, 1% by weight or less, 0.7% by weight or less, 0.5% by weight or less, 0.3% by weight or less, or 0.2% by weight or less based on the weight of the carrier particles. The support amount of Rh is, for example, 0.01% by weight or more, 0.02% by weight or more, 0.05% by weight or more, 0.07% by weight or more, 0.1% by weight or more, 0.2% by weight or more, 0.5% by weight or more, or 1% by weight or more based on the weight of the carrier particles.

In the one embodiment, when the particle size-controlled Rh fine particles supported on the carrier particles are used, the particle size-controlled Rh fine particles can be supported on the carrier particles by bringing the carrier particles into contact with a Rh fine particle precursor dispersion, which contains Rh fine particle precursors preliminarily controlled to a predetermined particle size distribution.

The Rh fine particle precursor dispersion can be manufactured by, for example, any of the following methods.

(1) a method (Method 1) that causes an acidic solution of a Rh compound to react with a basic solution in a reactor in which a clearance of a reaction field is set to a predetermined range; and (2) a method (Method 2) that mixes the acidic solution of the Rh compound with the basic solution to react and subsequently performs a stirring treatment in a high speed mixer.

In Method 1, by the use of the reactor in which the clearance of the reaction field is set to the predetermined range when causing the acidic solution of the Rh compound (for example, inorganic acid salt of Rh) to react with the basic solution (for example, aqueous solution of nitrogen-containing organic compound), the particle size and the particle size distribution of the Rh fine particle precursors (for example, hydroxides of Rh) contained in the obtained dispersion can be controlled.

Clearance adjustment members included in the reactor may be two flat plates, a combination of a flat plate and a wave-shaped plate, narrow tubes, and the like. The clearance of the reaction field can be appropriately set corresponding to a desired particle size and a desired particle size distribution. As the reactor in which the clearance of the reaction field is set to the predetermined range, for example, a micro reactor that includes an appropriate clearance adjustment member is usable.

In Method 2, the acidic solution of the Rh compound (for example, inorganic acid salt of Rh) is reacted with the basic solution (for example, aqueous solution of nitrogen-containing organic compound) to generate the Rh fine particle precursors as particles having large particle sizes, the stirring treatment of the Rh fine particle precursors is performed in the high speed mixer, and a strong shearing force is applied to disperse the Rh fine particle precursors, thereby controlling the average particle size and the particle size distribution of the dispersed Rh fine particle precursors.

The particle size-controlled Rh fine particles can be supported on the carrier particles by bringing the Rh fine particle precursor dispersion prepared as described above into contact with the carrier particles and subsequently performing the calcination.

The second catalyst coating layer is formed from a downstream end surface in the exhaust gas flow direction in a range of the length of 60% or more to 100% or less of the entire length of the substrate. That is, a coat width of the second catalyst coating layer is in a range of the length of 60% or more to 100% or less of the entire length of the substrate from the downstream end surface in the exhaust gas flow direction. When the coat width of the second catalyst coating layer is in this range, the high catalytic activity is achieved. The second catalyst coating layer may be formed from the downstream end surface over the entire length of the substrate. The coat width of the second catalyst coating layer is 70% or more to 100% or less of the entire length of the substrate from the downstream end surface in the exhaust gas flow direction in some embodiments, or may be in a range of the length of 70% or more to 80% or less. When the coat width of the second catalyst coating layer is in the range of the length of 70% or more to 80% or less, the Rh density in the downstream portion that significantly contributes to the catalytic activity increases, and the contact with the first catalyst coating layer containing Pd decreases, thus the deterioration of the second catalyst coating layer containing Rh is suppressed. Accordingly, the high catalytic activity is achieved.

The third catalyst coating layer is formed on the second catalyst coating layer. In the present disclosure, the description "the third catalyst coating layer is formed on the second catalyst coating layer" means that at least a part of the third catalyst coating layer is formed on the second catalyst coating layer. A part of the upstream side of the third catalyst coating layer may be formed on the first catalyst coating layer (see FIG. 2).

The third catalyst coating layer contains palladium (Pd) as a catalyst metal. The third catalyst coating layer may contain a catalyst metal other than Pd. As the catalyst metal, a platinum group noble metal, such as rhodium (Rh), platinum (Pt), ruthenium (Ru), osmium (Os), and iridium (Ir), can be used. The third catalyst coating layer may contain Pd alone as the catalyst metal.

The Pd content in the third catalyst coating layer is 0.01 g/L or more to 10 g/L or less based on the volume of the substrate in some embodiments and may be 0.1 g/L or more to 5 g/L or less in some embodiments. When the Pd content in the third catalyst coating layer is 0.01 g/L or more to 10 g/L or less, the high purification performance is achieved.

The third catalyst coating layer may contain any other component in addition to Pd. The other component is not specifically limited and includes an OSC material, a metal oxide, and the like. When the third catalyst coating layer contains the other component, its content is 80 g/L or less based on the volume of the substrate in some embodiments or may be 60 g/L or less in some embodiments. The third catalyst coating layer contains Pd alone in some embodiments.

The third catalyst coating layer is formed from the upstream end surface in the exhaust gas flow direction in a range of the length of 15% or more to 100% or less of the entire length of the substrate. That is, a coat width of the third catalyst coating layer is in a range of the length of 15% or more to 100% or less of the entire length of the substrate from the upstream end surface in the exhaust gas flow direction. The third catalyst coating layer may be formed over the entire length of the substrate. The coat width of the third catalyst coating layer is 25% or more to 100% or less of the entire length of the substrate from the upstream end surface in the exhaust gas flow direction in some embodiments or may be in a range of the length of 60% or more to 100% or less in some embodiments. With the third catalyst coating layer formed in a predetermined range from the upstream end surface in the exhaust gas flow direction, a part of the harmful components in the exhaust gas is converted in this layer through which the exhaust gas passes in the beginning, thereby ensuring the reduction of the noble metal amount in the lower layer.

The catalyst coating layer may comprise at least one additional catalyst coating layer in addition to the first to third catalyst coating layers. The catalyst coating layer comprises a fourth catalyst coating layer formed on the third catalyst coating layer in some embodiments.

The fourth catalyst coating layer contains palladium (Pd) as a catalyst metal in some embodiments.

The fourth catalyst coating layer may contain a catalyst metal other than Pd. As the catalyst metal, a platinum group noble metal, such as rhodium (Rh), platinum (Pt), ruthenium (Ru), osmium (Os), and iridium (Ir), can be used. The fourth catalyst coating layer may contain Pd alone as the catalyst metal.

The Pd content in the fourth catalyst coating layer is 0.01 g/L or more to 20 g/L or less based on the volume of the substrate in some embodiments and may be 0.1 g/L or more to 10 g/L or less. When the Pd content in the fourth catalyst coating layer is 0.01 g/L or more to 20 g/L or less, the high warm-up performance and the high purification performance are provided.

The fourth catalyst coating layer may contain any other component in addition to Pd. The other component is not specifically limited and includes an OSC material, a metal oxide, and the like. When the fourth catalyst coating layer contains the other component, its content is 80 g/L or less based on the volume of the substrate in some embodiments or may be 60 g/L or less in some embodiments. The fourth catalyst coating layer contains Pd alone in some embodiments.

The fourth catalyst coating layer is formed from the upstream end surface in the exhaust gas flow direction in a range of the length of 15% or more to 100% or less of the entire length of the substrate in some embodiments or may be formed in a range of the length of 15% or more to 50% or less in some embodiments. With the fourth catalyst coating layer formed in a predetermined range from the upstream end surface in the exhaust gas flow direction, the catalyst coating layer can be easily prepared, and the warm-up performance is improved.

In the one embodiment, the coat width of the third catalyst coating layer is in the range of the length of 60% or more to 100% or less of the entire length of the substrate from the upstream end surface in the exhaust gas flow direction, and the coat width of the fourth catalyst coating layer is in the range of the length of 15% or more to 50% or less of the entire length of the substrate from the upstream end surface in the exhaust gas flow direction. The exhaust gas purification catalyst of this embodiment can provide the high warm-up performance and the high catalytic activity at the same time.

FIG. 1 illustrates a first embodiment of the exhaust gas purification catalyst of the present disclosure. As illustrated in FIG. 1, an exhaust gas purification catalyst 10 comprises a substrate 11 and a catalyst coating layer 15 that is formed on the substrate 11 and has a three-layered structure. The catalyst coating layer 15 comprises a first catalyst coating layer 12, a second catalyst coating layer 13, and a third catalyst coating layer 14. In this embodiment, the first catalyst coating layer 12 is formed in a predetermined range from an upstream end surface in an exhaust gas flow direction. The second catalyst coating layer 13 and the third catalyst coating layer 14 are formed over the entire length of the substrate. In FIG. 1, an arrow indicates the exhaust gas flow direction.

Figure 2:
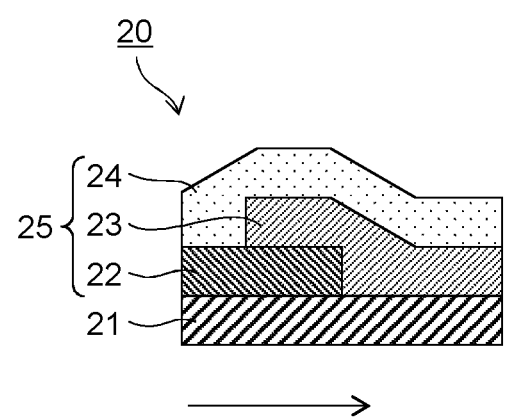
FIG. 2 is a cross-sectional schematic diagram illustrating a second embodiment of the exhaust gas purification catalyst of the present disclosure.

FIG. 2 illustrates a second embodiment of the exhaust gas purification catalyst of the present disclosure. As illustrated in FIG. 2, an exhaust gas purification catalyst 20 comprises a substrate 21 and a catalyst coating layer 25 that is formed on the substrate 21 and has a three-layered structure. The catalyst coating layer 25 comprises a first catalyst coating layer 22, a second catalyst coating layer 23, and a third catalyst coating layer 24. In this embodiment, the first catalyst coating layer 22 is formed in a predetermined range from an upstream end surface in an exhaust gas flow direction, the second catalyst coating layer 23 is formed in a predetermined range from a downstream end surface in the exhaust gas flow direction, and the third catalyst coating layer 24 is formed over the entire length of the substrate. In FIG. 2, an arrow indicates the exhaust gas flow direction.

The exhaust gas purification catalyst of the present disclosure can be produced by coating the substrate with a slurry or a solution containing the components of the catalyst coating layer by a method known to those skilled in the art. In one embodiment, for example, a predetermined range is coated with a slurry containing Pd, an OSC material, a metal oxide, and a barium compound from an upstream end surface using a known method, and drying and calcining are performed at a predetermined temperature for a predetermined time period, thus forming a first catalyst coating layer on a substrate. Subsequently, a predetermined range is coated with a slurry containing Rh, an OSC material, and a metal oxide from a downstream end surface using a known method, and drying and calcining are performed at a predetermined temperature for a predetermined time period, thus forming a second catalyst coating layer on the first catalyst coating layer. Subsequently, a predetermined range is coated with a Pd solution from the upstream end surface using a known method, and drying and calcining are performed at a predetermined temperature for a predetermined time period, thus forming a third catalyst coating layer on the second catalyst coating layer.

While the exhaust gas purification catalyst of the present disclosure can be used alone, the exhaust gas purification catalyst can be used for an exhaust gas purification catalyst system that comprises two or more catalysts. Because of the excellent warm-up performance, the exhaust gas purification catalyst of the present disclosure may be used for a start-up catalyst (S/C, also referred to as a start-up converter and the like) of an exhaust gas purification catalyst system that comprises two catalysts of the S/C mounted immediately below an internal combustion engine and an underfloor catalyst (UF/C, also referred to as an underfloor converter and the like) mounted rearward with respect to the S/C in an exhaust gas flow direction.

EXAMPLES

The following further specifically describes the present disclosure using examples. However, the technical scope of the present disclosure is not limited to the examples.

<Catalyst Preparation>

Used Raw Material

Material 1: $Al_2O_3$: $La_2O_3$ composite $Al_2O_3$($La_2O_3$: 1% by weight to 10% by weight)

Material 2: ACZ: $Al_2O_3$—$CeO_2$—$ZrO_2$ composite oxide ($CeO_2$: 15% by weight to 30% by weight, $Nd_2O_3$, $La_2O_3$, and $Y_2O_3$ are added by a small amount, and provided with high heat resistance)

Material 3: CZ composite oxide 1 (CZ material 1): 50% by weight-$ZrO_2$, 40% by weight-$CeO_2$, 5% by weight-$La_2O_3$, 5% by weight-$Y_2O_3$ composite oxide Material 4: CZ composite oxide 2 (CZ material 2): 20% by weight-$CeO_2$, 70% by weight-$ZrO_2$, 5% by weight-$La_2O_3$, 5% by weight-$Y_2O_3$ composite oxide Material 5: Pd nitrate solution Material 6: Rh nitrate solution Material 7: particle size-controlled Rh dispersion Material 8: Ba sulfate solution Substrate: cordierite honeycomb substrate of 875 cc (600 cells hexagon, wall thickness 2 mil)

The material 7 was prepared as follows.

Material 7: particle size-controlled Rh dispersion 0.2 g of Rh(III) nitrate was added in 50 mL of ion exchanged water and dissolved, thereby preparing an acidic solution (pH 1.0) of a Rh compound.

A tetraethylammonium hydroxide aqueous solution (concentration 175 g/L, pH 14) was provided as an organic base solution.

Using a reactor (micro reactor) that included two flat plates as the clearance adjustment members, with a method of introducing the acidic solution of the Rh compound and the organic base solution into a reaction field in which the clearance was set to 10 μm, both liquids were reacted under a condition in which a mole ratio (TEAH/RN) of tetraethylammonium hydroxide (TEAH) to Rh nitrate (RN) was 18 to prepare a Rh fine particle precursor dispersion. The obtained Rh fine particle precursor dispersion had pH 14. The median diameter (D50) of the Rh fine particle precursors contained in the obtained Rh fine particle precursor dispersion was measured by a dynamic light scattering method (DLS), and the median diameter (D50) was 2.0 nm.

Comparative Example 1

The material 5, the material 3, the material 1, the material 8, and an $Al_2O_3$-based binder were added to a distilled water while stirring them, and a slurry 1 in which these materials were suspended was prepared. Subsequently, the prepared slurry 1 was poured onto a substrate from an upstream end surface, and an unnecessary portion was blown off by a blower, thus coating a wall surface of a substrate with the materials. The coat width was adjusted to 100% of the entire length of the substrate. The coating amount was adjusted to 5 g/L of the material 5 as Pd, 50 g/L of the material 3, 50 g/L of the material 1, and 5 g/L of the material 8, based on the volume of the substrate. Finally, drying was performed by a dryer at 120° C. for two hours, and subsequently, calcination was performed by an electric furnace at 500° C. for two hours, thus preparing a first catalyst coating layer.

Similarly, the material 6, the material 2, the material 4, the material 1, and the $Al_2O_3$-based binder were added to the distilled water while stirring them, and a slurry 2 in which these materials were suspended was prepared. The slurry 2 was poured onto the substrate, on which the first catalyst coating layer was formed, from a downstream end surface, and an unnecessary portion was blown off by the blower, thus coating the wall surface of the substrate with the materials. The coat width was adjusted to 100% of the entire length of the substrate. The coating amount was adjusted to 1 g/L of the material 6 as Rh, 50 g/L of the material 2, 50 g/L of the material 4, and 50 g/L of the material 1, based on the volume of the substrate. Finally, drying was performed by the dryer at 120° C. for two hours, and subsequently, calcination was performed by the electric furnace at 500° C. for two hours, thus preparing a second catalyst coating layer to obtain a catalyst of Comparative Example 1 that comprises two catalyst coating layers.

Comparative Example 2

The first and the second catalyst coating layers were prepared similarly to Comparative Example 1 except that the slurry 1 was prepared such that the coating amount of the material 5 was 4 g/L as Pd.

Subsequently, the Pd nitrate solution was poured onto the substrate, on which the first and the second catalyst coating layers were formed, from the upstream end surface, and an unnecessary portion was blown off by the blower, thus coating the wall surface of the substrate with Pd. The coat width was adjusted to 100% of the entire length of the substrate. The coating amount was adjusted such that Pd was 1 g/L based on the volume of the substrate. Finally, drying was performed by the dryer at 120° C. for two hours, and subsequently, calcination was performed by the electric furnace at 500° C. for two hours, thus preparing a third catalyst coating layer to obtain a catalyst of Comparative Example 2 that comprises three catalyst coating layers.

Example 1

A catalyst of Example 1 that comprises three catalyst coating layers was prepared similarly to Comparative Example 2 except that the slurry 1 was prepared such that the coating amount of the material 5 was 8 g/L as Pd and the coat width of the first catalyst coating layer was adjusted to 50% of the entire length of the substrate from the upstream end surface.

Example 2

A catalyst of Example 2 that comprises three catalyst coating layers was prepared similarly to Example 1 except that the material 6 of the slurry 2 was changed to the material 7. The particle sizes of the particle size-controlled Rh fine particles were measured by the transmission electron microscope (TEM), and the average particle size was 1.7 nm and the standard deviation σ of the particle size was 0.4 nm.

Example 3

A catalyst of Example 3 that comprises three catalyst coating layers was prepared similarly to Example 2 except that the coat width of the second catalyst coating layer was adjusted to 75% of the entire length of the substrate from the downstream end surface.

Example 4

The first, the second, and the third catalyst coating layers were prepared similarly to Example 3 except that the coat width of the first catalyst coating layer was adjusted to 25% of the entire length of the substrate from the upstream end surface.

Subsequently, the Pd nitrate solution was poured onto the substrate, on which the first, the second, and the third catalyst coating layers were formed, from the upstream end surface, and an unnecessary portion was blown off by the blower, thus coating the wall surface of the substrate with Pd. The coat width was adjusted to 25% of the entire length of the substrate from the upstream end surface. The coating amount was adjusted to 8 g/L as Pd based on the volume of the substrate. Finally, drying was performed by the dryer at 120° C. for two hours, and subsequently, calcination was performed by the electric furnace at 500° C. for two hours, thus preparing a fourth catalyst coating layer to obtain a catalyst of Example 4 that comprises four catalyst coating layers.

Table 1 indicates the configurations of the catalysts of Examples 1 to 4 and Comparative Examples 1 and 2. The noble metal amount is a noble metal amount (g/substrate 1 L) based on the volume of the substrate.

TABLE 1

| | Number of layers | First catalyst coating layer | | | Second catalyst cotaing layer | | | Third catalyst coating | | | Fourth catalyst coating layer | | |
|---|---|---|---|---|---|---|---|---|---|---|---|---|---|
| | | Composition | Noble metal amount | Coat width | Composition | Noble metal amount | Coat width | Composition | Noble metal amount | Cost width | Composition | Noble metal amount | Coat width |
| Comparative Example 1 | 2 | Pd/CZ material 1 $Al_2O_3$ Ba sulfate | Pd 5 g/L | 100% | Rh/ACZ CZ material 2 $Al_2O_3$ | Rh 1 g/L | 100% | None | None | None | None | None | None |
| Comparative Example 2 | 3 | Pd/CZ material 1 $Al_2O_3$ Ba sulfate | Pd 4 g/L | 100% | Rh/ACZ CZ material 2 $Al_2O_3$ | Rh 1 g/L | 100% | Pd | Pd 1 g/L | 100% | None | None | None |

TABLE 1-continued

| | Number of layers | First catalyst coating layer | | | Second catalyst coating layer | | | Third catalyst coating | | | Fourth catalyst coating layer | | |
|---|---|---|---|---|---|---|---|---|---|---|---|---|---|
| | | Composition | Noble metal amount | Cost width | Composition | Noble metal amount | Coat width | Composition | Noble metal amount | Cost width | Composition | Noble metal amount | Coat width |
| Example 1 | 3 | Pd/CZ material 1 Al₂O₃ Ba sulfate | Pd 8 g/L | 50% from upstream end surface | Rh/ACZ CZ material 2 Al₂O₃ | Rh 1 g/L | 100% | Pd | Pd 1 g/L | 100% | None | None | None |
| Example 2 | 3 | Pd/CZ material 1 Al₂O₃ Ba sulfate | Pd 8 g/L | 50% from upstream end surface | Particle size-controlled Rh/ACZ CZ material 2 Al₂O₃ | Rh 1 g/L | 100% | Pd | Pd 1 g/L | 100% | None | None | None |
| Example 3 | 3 | Pd/CZ material 1 Al₂O₃ Ba sulfate | Pd 8 g/L | 50% from upstream end surface | Particle size-controlled Rh/ACZ CZ material 2 Al₂O₃ | Rh 1.33 g/L | 75% from downstream end surface | Pd | Pd 1 g/L | 100% | None | None | None |
| Example 4 | 4 | Pd/CZ material 1 Al₂O₃ Ba sulfate | Pd 8 g/L | 25% from upstream end surface | Particle size-controlled Rh/ACZ CZ material 2 Al₂O₃ | Rh 1.33 g/L | 75% from downstream end surface | Pd | Pd 1 g/L | 100% | Pd | Pd 8 g/L | 25% from upstream end surface |

<Durability Test>

The durability test was performed for each of the prepared catalysts using an actual engine. Specifically, the durability test was performed as follows. The catalysts were each installed to an exhaust system of a V-type eight-cylinder engine, exhaust gases in respective stoichiometric and lean atmospheres were repeatedly flown for a certain period of time (a ratio of 3:1) at a catalyst bed temperature of 950° C. for 50 hours.

<Performance Evaluation>

Warm-Up Property

The exhaust gas purification catalysts on which the durability test had been performed were each installed to an exhaust system of a L-type four-cylinder engine, the exhaust gas of air-fuel ratio (A/F)=14.4 was supplied, and an inlet gas was introduced under a condition of Ga=16 g/s, thus measured the time required to allow HC to reach T50 (50% conversion rate).

Catalytic Activity after Warm-Up

The exhaust gas purification catalysts on which the durability test had been performed were each installed to an exhaust system of a L-type four-cylinder engine, the exhaust gas of air-fuel ratio (A/F)=14.4 was supplied, and a temperature rise property (to 500° C.) was evaluated under a condition of Ga=30 g/s. The NOx conversion rate when the inlet gas temperature became 500° C. was measured, thus evaluated the catalytic activity.

OSC Property

The exhaust gas purification catalysts on which the durability test had been performed were each installed to an exhaust system of a L-type four-cylinder engine, the exhaust gas of air-fuel ratio (A/F)=14.1 to 15.1 was supplied, and oxygen storage capacity amounts when repeated in a short cycle was measured. It is indicated that the larger the value is, the more an A/F variation of an engine output gas can be absorbed, which maintains an atmosphere inside the catalyst to around a stoichiometric state and a high purification performance.

Figure 3:
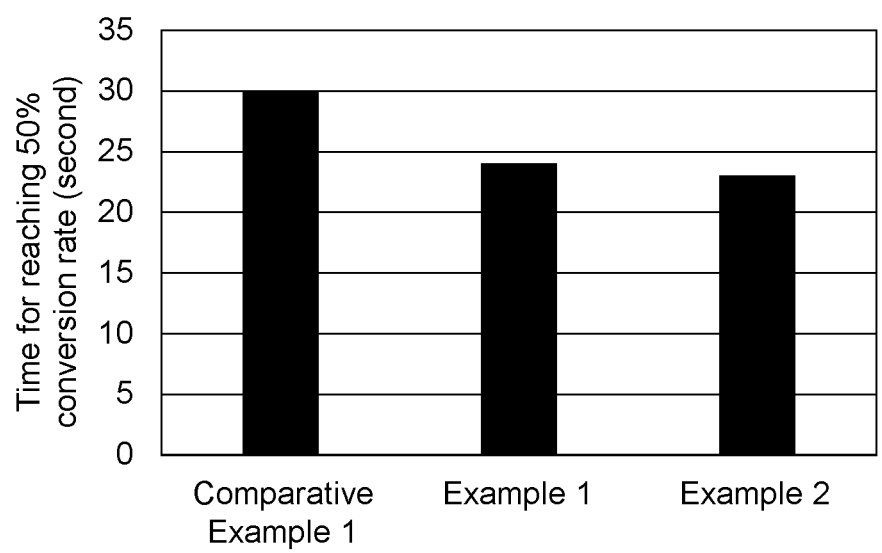
FIG. 3 is a graph illustrating warm-up properties of catalysts of Examples 1 and 2, and Comparative Example 1.
Figure 4:
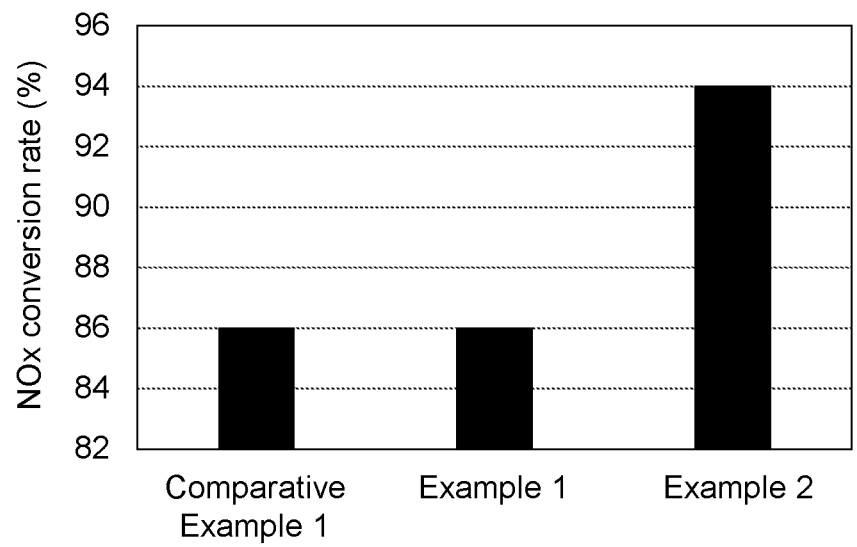
FIG. 4 is a graph illustrating NOx conversion rates after warm-up of the catalysts of Examples 1 and 2, and Comparative Example 1.
Figure 5:
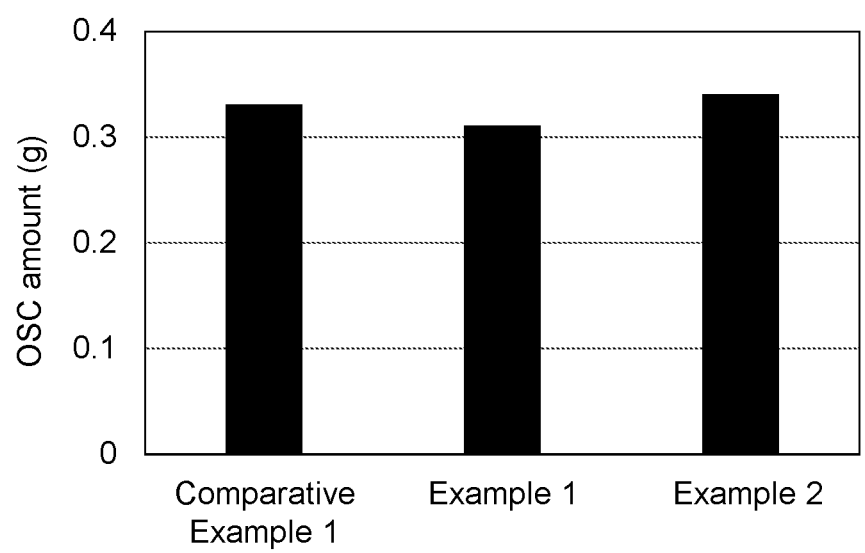
FIG. 5 is a graph illustrating OSC properties of the catalysts of Examples 1 and 2, and Comparative Example 1.

Table 2 indicates the evaluation results of the catalysts of Examples 1 to 4 and Comparative Examples 1 and 2. FIG. 3 illustrates the warm-up properties of the catalysts of Examples 1 and 2 and Comparative Example 1. FIG. 4 illustrates the NOx conversion rates after warm-up of the catalysts of Examples 1 and 2 and Comparative Example 1. FIG. 5 illustrates the OSC properties of the catalysts of the examples 1 and 2 and the comparative example 1.

TABLE 2

| | Warm-up property Time for reaching 50% conversion rate (second) | Catalytic activity after warm-up NOx converrsion rate (%) | OSC property OSC amount (g) |
|---|---|---|---|
| Comparative Example 1 | 30 | 86 | 0.33 |
| Comparative Example 2 | 29 | 90 | 0.33 |
| Example 1 | 24 | 86 | 0.31 |
| Example 2 | 23 | 94 | 0.34 |
| Example 3 | 23 | 97 | 0.34 |
| Example 4 | 18 | 97 | 0.33 |

As indicated in Table 2, for the catalyst of Comparative Example 2, the catalytic activity after warm-up improved compared with the catalyst of Comparative Example 1 because the third catalyst coating layer containing Pd was disposed on the outermost layer. This is considered because only the noble metal is disposed to the outermost layer having high contact with the exhaust gas and high reactivity. In addition, as indicated in Table 2 and FIG. 3, for the catalyst of Example 1, the warm-up performance was significantly improved compared with the catalysts of Comparative Examples 1 and 2 by decreasing the coat width of the first catalyst coating layer. This is considered because the noble metal density in the upstream portion having a large contribution to the warm-up performance increased.

As indicated in Table 2 and FIG. 3 to FIG. 5, for the catalyst of Example 2, because of the use of the particle size-controlled Rh fine particles, the catalytic activity and the OSC performance were improved while the warm-up performance was maintained compared with Example 1, and the warm-up performance, the catalytic activity, and the OSC performance were all improved compared with Comparative Example 2. This is considered because the durability of Rh was improved to improve the activity of Rh by the use of the particle size-controlled Rh fine particles.

As indicated in Table 2, when the coat width of the second catalyst coating layer was decreased like Example 3, the catalytic activity after warm-up was further improved compared with Example 2. This is considered because the Rh density of the downstream portion having a large contribution to the catalytic activity after warm-up increased. When the coat widths of the first catalyst coating layer and the fourth catalyst coating layer were decreased to 25% like Example 4, the warm-up performance was further improved. This result indicates that the warm-up performance is improved by disposing a large amount of noble metals in the upstream portion.

All publications, patents, and patent applications cited herein are incorporated herein by reference in their entirety.

DESCRIPTION OF SYMBOLS

10 Exhaust gas purification catalyst
11 Substrate
12 First catalyst coating layer
13 Second catalyst coating layer
14 Third catalyst coating layer
15 Catalyst coating layer
20 Exhaust gas purification catalyst
21 Substrate
22 First catalyst coating layer
23 Second catalyst coating layer
24 Third catalyst coating layer
25 Catalyst coating layer

What is claimed is:

1. An exhaust gas purification catalyst comprising:
a substrate; and
a catalyst coating layer formed on the substrate,
wherein the catalyst coating layer comprises at least a first catalyst coating layer, a second catalyst coating layer, and a third catalyst coating layer, the first catalyst coating layer is formed on the substrate, the second catalyst coating layer is formed on the first catalyst coating layer, and the third catalyst coating layer is formed on the second catalyst coating layer,
wherein the first catalyst coating layer contains Pd as a catalyst metal, and is formed in a range of a length of 15% or more to 60% or less of an entire length of the substrate from an upstream end surface in an exhaust gas flow direction,
wherein the second catalyst coating layer contains Rh as a catalyst metal, and is formed in a range of a length of 60% or more to 100% or less of the entire length of the substrate from a downstream end surface in the exhaust gas flow direction,
wherein the third catalyst coating layer contains Pd as a catalyst metal, and is formed in a range of a length of 15% or more to 100% or less of the entire length of the substrate from the upstream end surface in the exhaust gas flow direction, and
wherein Rh in the second catalyst coating layer is Rh fine particles having an average particle size of 1.0 nm or more to 2.0 nm or less measured by a transmission electron microscope observation, and a standard deviation a of the particle size of 0.8 nm or less.

2. An exhaust gas purification catalyst comprising:
a substrate; and
a catalyst coating layer formed on the substrate,
wherein the catalyst coating layer comprises at least a first catalyst coating layer, a second catalyst coating layer, and a third catalyst coating layer, the first catalyst coating layer is formed on the substrate, the second catalyst coating layer is formed on the first catalyst coating layer, and the third catalyst coating layer is formed on the second catalyst coating layer,
wherein the first catalyst coating layer contains Pd as a catalyst metal, and is formed in a range of a length of 15% or more to 60% or less of an entire length of the substrate from an upstream end surface in an exhaust gas flow direction,
wherein the second catalyst coating layer contains Rh as a catalyst metal, and is formed in a range of a length of 60% or more to 100% or less of the entire length of the substrate from a downstream end surface in the exhaust gas flow direction,
wherein the third catalyst coating layer contains Pd as a catalyst metal, and is formed in a range of a length of 15% or more to 100% or less of the entire length of the substrate from the upstream end surface in the exhaust gas flow direction, and
wherein the catalyst coating layer further comprises a fourth catalyst coating layer formed on the third catalyst coating layer, the fourth catalyst coating layer contains Pd as a catalyst metal, and the fourth catalyst coating layer is formed in a range of a length of 15% or more to 50% or less of the entire length of the substrate from the upstream end surface in the exhaust gas flow direction.

* * * * *